Takahashi et al.
[45] Feb. 22, 1972

[54] ENDOSCOPIC APPARATUS

[72] Inventors: Nagashige Takahashi; Kunio Kinoshita, both of Tokyo, Japan

[73] Assignee: Olympus Optical Co., Ltd., Shibuya-ku, Tokyo, Japan

[22] Filed: Dec. 19, 1969

[21] Appl. No.: 886,552

[30] Foreign Application Priority Data

Dec. 24, 1968 Japan..................................43/94475
Dec. 24, 1968 Japan..................................43/94476

[52] U.S. Cl. ..............................................................128/6
[51] Int. Cl. .........................................................A61b 1/06
[58] Field of Search .....................................128/6–9, 11, 13, 128/16, 18, 215

[56] References Cited

UNITED STATES PATENTS

| | | | |
|---|---|---|---|
| 3,071,129 | 1/1963 | Wasserman | 128/6 |
| 3,132,646 | 5/1964 | Hett | 128/6 |
| 3,508,545 | 4/1970 | Reif et al. | 128/215 |

FOREIGN PATENTS OR APPLICATIONS

| | | | |
|---|---|---|---|
| 548,462 | 10/1942 | Great Britain | 128/8 |
| 126,844 | 5/1919 | Great Britain | 128/7 |

*Primary Examiner*—Lucie H. Laudenslager
*Attorney*—Kelman and Berman

[57] ABSTRACT

Endoscopic apparatus comprising a major endoscope and a minor endoscope adapted to be inserted in the major endoscope and capable of viewing on a magnified scale an object sought by the major endoscope. The forward end portion of the minor endoscope is provided with a cylindrical wall extending forwardly therefrom so that, by contacting the front end edge of the cylindrical wall with the object, the forward end portion of the minor endoscope can be firmly secured relative to the object, while a sharp image of the object can be properly observed on a magnified scale through an objective lens provided in the forward end portion by virtue of the proper spacing of the objective lens from the object by means of the cylindrical wall extending forwardly from the forward end portion of the minor endoscope. In order to positively fix the forward end portion in position relative to the object, the front end edge of the cylindrical wall may be provided with a plurality of pricking needles which prick the object when the cylindrical wall contacts the object or vacuum may be introduced into the hollow space defined by the cylindrical wall between the object and the front end of the objective lens.

8 Claims, 22 Drawing Figures

INVENTORS.
Nagashige Takahashi
Kunio Kinoshita
By: Kelman and Berman
AGENTS

ENDOSCOPIC APPARATUS

BACKGROUND OF THE INVENTION

The present invention relates to an endoscopic apparatus comprising a major or parent endoscope and a minor or son endoscope adapted to be inserted into the major endoscope and capable of inspecting an image of an object such as an internal organ of a living body at high magnification.

Heretofore, for the inspection of an internal organ of a living body, a portion of the tissue of the internal organ to be inspected has been taken out of the living body by using means such as forceps so as to prepare a specimen therefrom and the thus prepared specimen has been observed by a microscope. However, such a procedure results in damage to the tissue or deterioration of the freshness of the tissue to be inspected. Further, the above procedure is very troublesome and time consuming.

It has also been proposed for the inspection of an internal organ of a living body to utilize an endoscope, the forward end portion of which is directly inserted into the internal organ to be inspected and the image of the object formed in the forward end portion by an objective lens provided therein is transmitted through the elongated tube to the control housing of the endoscope so as to be viewed through an eyepiece provided in the control housing. However, in the prior art endoscope, no means has been provided for fixing the forward end portion in position relative to the object to be inspected so that it has been very difficult to obtain high quality of the image. Further, since stray light reflected from the object could not be prevented from entering the objective lens in the prior art endoscope, the image obtained was deteriorated.

The present invention aims at avoiding the above described disadvantages of the prior art endoscope and providing a novel and useful endoscopic apparatus.

SUMMARY OF THE INVENTION

An object of the present invention is to provide a novel and useful endoscopic apparatus which avoids the above described disadvantages of the prior art endoscope.

Another object of the present invention is to provide a novel and useful endoscopic apparatus of the type described above comprising a major or parent endoscope and a minor or son endoscope adapted to be inserted into the major endoscope, wherein the forward end portion of the minor endoscope can be positively fixed in position relative to the object to be inspected thereby permitting the sharpness of image of the object to be improved while the stray light is positively prevented from entering the objective lens in the forward end portion.

The above objects are achieved in accordance with the present invention by the provision of a cylindrical member projecting forwardly from the forward end of the forward end portion of the minor endoscope which directly contacts the object so that the distance between the object and the objective lens is positively set properly while the relative position of the objective lens to the object is securely fixed thereby permitting the desired portion of the object to be observed in a stable condition.

In accordance with one feature of the present invention, a plurality of pricking needles may be provided in the forward end edge of the cylindrical wall in spaced relationship from each other so that the needles prick the object when the cylindrical wall contacts the object thereby permitting the forward end portion of the minor endoscope to be firmly held in position relative to the object.

In accordance with another feature of the present invention, the pricking needles may be secured to a needle-supporting ring slidably fitting in the cylindrical wall and controllably shifted forwards and rearwards by the remote control effected from the control housing of the minor endoscope so that the insertion of the minor endoscope into the major endoscope is facilitated by retracting the needles into the cylindrical member while the needles are projected beyond the cylindrical wall so as to prick the object for positively securing the forward end portion relative to the object when the cylindrical wall is contacted with the object.

In accordance with a further feature of the present invention, the hollow space defined by the cylindrical wall between the object contacting with the cylindrical wall and the objective lens in the forward end portion is evacuated by means of a vacuum pump connected to the hollow space through the elongated tube of the minor endoscope so that the cylindrical wall is positively secured in position relative to the object by virtue of the vacuum existing in the hollow space.

In accordance with a still further feature of the present invention, manually operable valve means is provided in the control housing of the minor endoscope which is located in a pipe connecting the vacuum pump to the hollow space so that the hollow space is intermittently evacuated by the operation of the valve means while the vacuum pump is driven continuously.

DETAILED DESCRIPTION OF THE PREFERRED EMBODIMENTS

Figure 1:
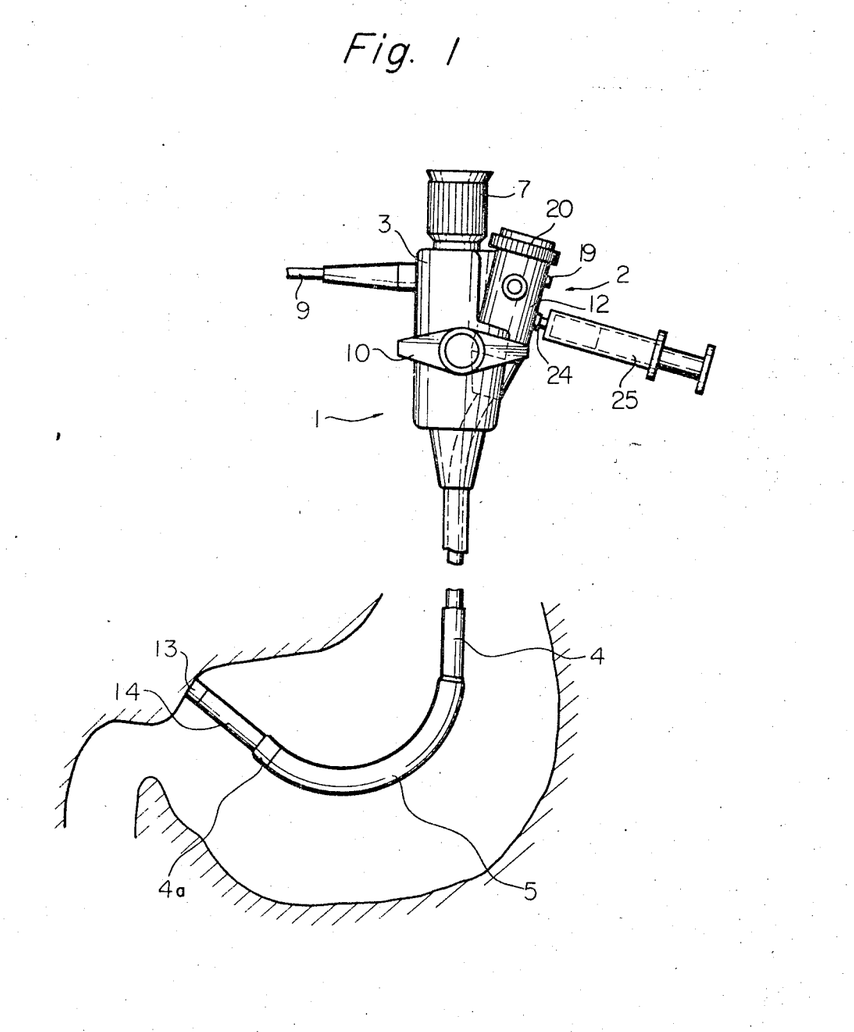
FIG. 1 is an elevational view of an embodiment of the present invention showing the manner how the present invention is utilized.
Figure 5:
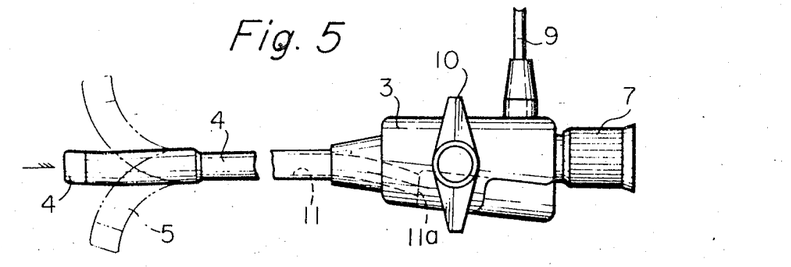
FIG. 5 is an elevational view of an embodiment of the major endoscope of the present invention.
Figures 6, 7:
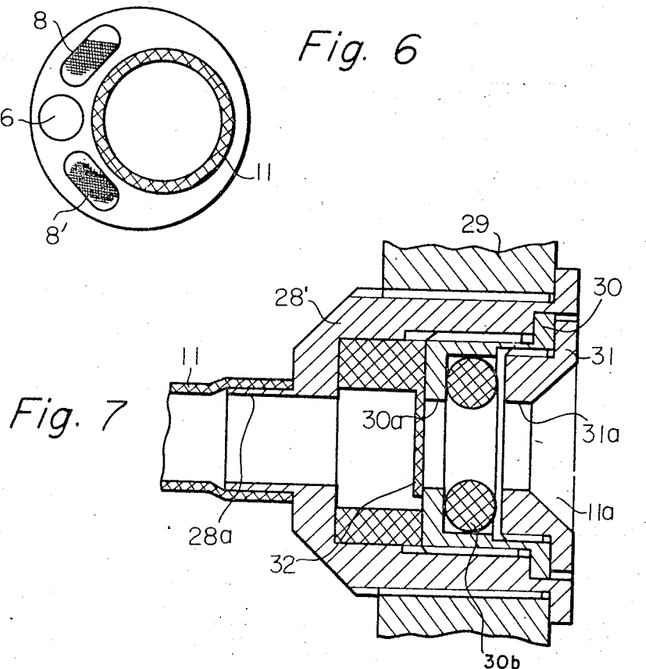
FIG. 6 is a front view showing the arrangement of various elements in the forward end portion of the major endoscope of FIG. 5.
FIG. 7 is a fragmentary sectional view showing the arrangement of the sealing flap valve and the O-ring provided in the control housing of the major endoscope for preventing the fluid in the internal organ to be inspected from flowing out of the control housing.

Referring to FIG. 1 showing an embodiment of the endoscopic apparatus constructed in accordance with the present invention, the endoscopic apparatus comprises a major or parent endoscope 1 and a minor or son endoscope 2. The major endoscope 1 is comprised of a control housing 3 and a forward end portion 4a connected to the control housing 3 through an elongated tube 4 having a bendable portion 5 adjacent to the forward end portion 4a. An objective lens 6 is provided in the forward end portion as shown in FIG. 6, and an image-transmitting optical fiber system (not shown) extends through the elongated tube 4 with the forward end surface positioned behind the objective lens 6 an appropriate distance spaced therefrom while the rearward end of the image-transmitting optical system terminates in the control housing 3 at a position spaced an appropriate distance from an ocular or eyepiece 7 provided in the control housing 3. Thus, an image of an object is focused by the objective lens 6 onto the forward end surface of the image-transmitting optical system and is transmitted therethrough to the rearward end and can be viewed through the eyepiece 7. In order to illuminate the object, a pair of illuminating light-conducting fiber optical systems 8, 8' are provided which extend from the forward end portion 4 a through the elongated tube 4 toward the control housing 3, and an external light source (not shown) is connected to the rearward end of each of the pair of light-conducting fiber optical systems 8, 8' directly or through another light-conducting fiber optical system 9 connectable to the rearward end of each of the pair of light-conducting fiber optical systems 8, 8', thus the light from the light source is transmitted through the light-conducting fiber optical systems 8, 8' to the forward ends thereof and projected therefrom to illuminate the object. The bendable portion 5 is, as shown in FIG. 5, controllably bent by a pair of wires (not shown) extending through the elongated tube 4 at diametrically opposite positions therein and connected at the forward ends thereof to the diametrically opposite positions in the forward end of the bendable portion 5 and with their rearward ends operably coupled with an operating handle 10 which is rotatably provided in the control housing 3 and actuates the wires upon operation thereof. Thus, the forward end portion 4a can be inserted conveniently into a cavity of a living body and located at any desired portion thereof by controllably bending the bendable portion 5 while viewing the image of the object.

An elongated guide channel 11 is provided in the major endoscope 1 which extends through the elongated tube 4 with the forward end thereof opening at the forward end of the forward end portion 4a while the rearward end of the guide channel 11 extends through the control housing 3 and opens to the exterior thereof. The guide channel 11 serves to pass therethrough the minor endoscope to be described below.

Figure 2:
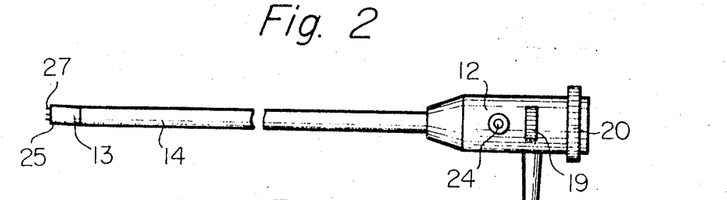
FIG. 2 is a corresponding view of an embodiment of the minor endoscope of the present invention.

The minor endoscope 2 comprises, as shown in FIGS. 1 and 2, a control housing 12 and a forward end portion 13 connected to the control housing 12 through an elongated yieldably flexible tube 14. In like manner as in the case of the major endoscope 1, an objective lens system 15 is located in the forward end portion 13 and an image-transmitting optical fiber system 16 extends through the elongated flexible tube 14 with its forward end surface 16a located behind the objective lens system 15 spaced an appropriate distance therefrom. The objective lens system 15 is mounted in a slidable lens barrel 17 slidably fitted in the forward end portion 13 and the forward end of a wire 18 is secured to the barrel 17 and the wire extends through the elongated tube 14 to the control housing 12. The rearward end of the wire 18 is operably connected to an adjusting knob 19, so that, upon actuation of the knob 19, the wire 18 is pulled or pushed so that the barrel 17 is shifted forwards or rearwards relative to the front end surface 16a of the image-transmitting optical system 16 thereby permitting the focusing of the objective lens system 15 to be effected. The rearward end of the image-transmitting optical system 16 terminates in the control housing 12 and an eyepiece 20 is located behind the rearward end of the image-transmitting optical system 16 so that the image focused on the front end surface 16a by the objective lens system and transmitted therethrough to the rearward end thereof is viewed through the eyepiece 20.

The magnification of the objective lens system 15 is selected to be very high as compared to the magnification of the objective lens 6 of the major endoscope which suffices to find the object to be inspected whereupon the object can be observed by the objective lens system 15 on a greatly enlarged scale.

As shown in FIG. 1, the forward end portion 13 of the minor endoscope 2 together with the elongated tube 14 can be inserted into the guide channel 11 of the major endoscope 1 from the control housing thereof prior to or after the insertion of the forward end portion 4a of the major endoscope 1 into a hollow body portion to be inspected, and the forward end portion 13 of the minor endoscope 2 can be projected beyond the forward end portion 4a of the major endoscope 1. Thus, the forward end portion 13 can be directed to the desired portion of the object to be inspected by appropriately actuating the bendable portion 5 of the major endoscope 1 while the object is observed by the major endoscope 1.

In order to illuminate the object, a pair of illuminating light-conducting fiber optical systems 21, 21' extend through the elongated tube 14 with their forward ends terminating at the front end surface 13a of the forward end portion 13, and directed forwardly of the forward end portion 13 so as to permit the illuminating light to be directed therefrom toward the object while their rearward ends are adapted to be supplied with the illuminating light from an external light source (not shown) directly or through another light-conducting fiber optical system 22 in like manner as in the case of the major endoscope 1. A pipe 23 extends through the elongated tube 14 with the forward end thereof opening in the front end surface 13a of the forward end portion 13 while the rearward end thereof is connected to a connecting member 24. The pipe 23 serves to supply transparent liquid from a supply syringe 25 connected to the connecting member 24 toward the forward end portion 13.

Figures 3, 4:
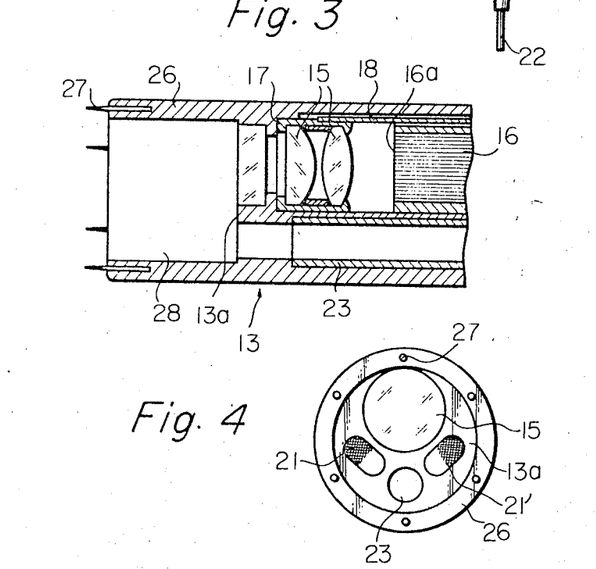
FIG. 3 is a fragmentary sectional view of the forward end portion of the minor endoscope of FIG. 2.
FIG. 4 is a front view showing the arrangement of the objective lens, the illuminating light-conducting fiber optical systems and other elements in the forward end portion shown in FIG. 3.

In accordance with a characteristic feature of the present invention, the forward end portion 13 is provided with a cylindrical wall member 26 extending forwardly therefrom. The circular forward end edge of the cylindrical member 26 is engaged with the object in a plane perpendicular to the direction of elongation of the end portion 13 after the forward end portion 13 is properly directed to the desired portion of the object, thereby permitting the forward end portion 13 to be securely fixed in position relative to the object. The length of the cylindrical member 26 is appropriately selected so that the image of the object is focused on the front-end surface 16a of the image-transmitting optical system 16 by means of the objective lens system 15.

In order to positively secure the front-end edge of the cylindrical member 26 to the object, a plurality of pricking needles 27 are secured in the front end edge of the cylindrical member 26 in spaced relationship from each other which are directed forwardly of the forward end portion 13. When the cylindrical member 26 contacts the object, the needles prick the object thereby firmly fixing the forward end portion 13 with respect to the object desired to be inspected.

In order to improve the optical performance of the objective lens system 15, a transparent liquid is introduced into the hollow space or chamber 28 defined by the cylindrical member 26 between the object and the objective lens system 15 through the pipe 23 from the supply syringe 25 described previously.

FIG. 7 shows the construction of a sealing device provided at the rearward end opening 11a of the guide channel 11 opening in the stepped portion of the control housing 3 of the major endoscope 1. The rearward end portion of the guide channel 11 is comprised of a holder member 28' connected to the rear end of the channel 11 and secured to the wall 29 forming the stepped portion of the control housing 3, an intermediate member 30 threaded in the hole of the holder member 28' and a cap member 31 also threaded in the holder member 28' outside of the intermediate member 30. Each of the members 28', 30, 31 is provided with a through-hole 28a, 30a, 31a so that the rearward end opening 11a communicates with the guide channel 11. A resilient flap valve 32 is interposed between the holder member 28' and the intermediate member 30 as shown in FIG. 7. The flap valve 32 normally resiliently closes the through-hole 30a from the side forwardly of the intermediate member 30 so that it prevents any liquid which might be conducted through the guide channel 11 from the hollow body portion into which the forward end portion 4a is inserted from flowing out of the through-hole 30a while the flap valve 32 can be bent forwardly so as to allow the forward end portion 13 to be inserted in the channel 11 through the through-hole 30a. In order to tightly seal the elongated tube 14 of the minor endoscope 2 from the exterior of the control housing 3 when the tube 14 is inserted into the channel 11, an O-ring 30b is interposed between the intermediate member 30 and the cap member 31.

Figure 8:
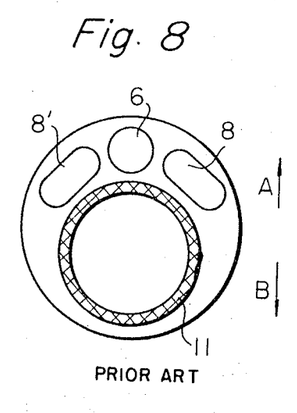
FIG. 8 is a cross-sectional view of the elongated tube of a known endoscope showing the arrangement of various elements therein.

In the prior art major endoscope shown in FIG. 8, the guide channel 11 is located in cross section in the elongated tube 4 at a position offset from the neutral plane of the bending of the bendable portion 5. Therefore, the image-transmitting optical system and the light-conducting fiber optical systems 8, 8' are necessarily located in positions offset from the neutral plane of the bending of the bendable portion 5. Thus, the image-transmitting optical system as well as the light-conducting fiber optical systems 8, 8' tends to be broken under stresses in tension and compression when the bendable portion 5 is controllably bent in the direction indicated by the arrow A or B during the operation of the major endoscope 1 or during the manufacture thereof.

Figure 9:
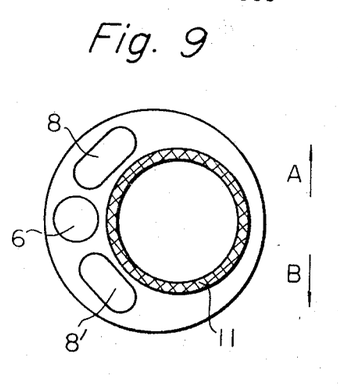
FIG. 9 is a cross-sectional view similar to FIG. 8 but showing the arrangement of various elements in the elongated tube of the major endoscope of the present invention.

In accordance with a feature of the present invention, the guide channel 11 is located in cross section in the elongated tube 4 in the neutral plane of the bending of the bendable portion 5 in the direction indicated by the arrow A or B as shown in FIG. 9. Therefore, the image-transmitting optical system as well as the light-conducting fiber optical systems can be located in or close to the neutral plane of the bending of the bendable portion 5 thereby permitting the forced elongation or contraction of the image-transmitting optical system and the light-conducting fiber optical systems caused by the bending of the bendable portion 5 to be minimized so that the breakage of the optical systems are widely avoided.

Figure 10:
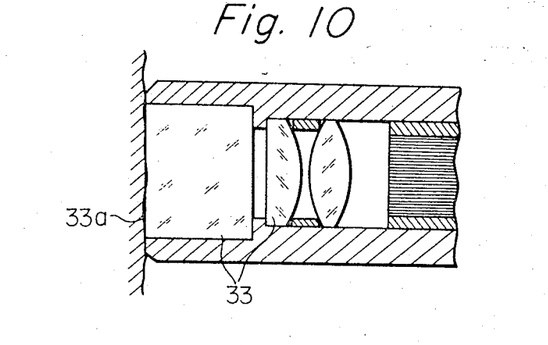
FIG. 10 is a fragmentary sectional view of the forward end portion of a prior art endoscope.
Figure 11:
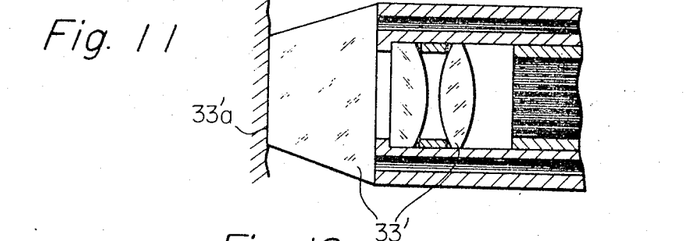
FIG. 11 is a view similar to FIG. 10 showing a modification of the forward end portion of a prior art endoscope.
Figures 12, 13:
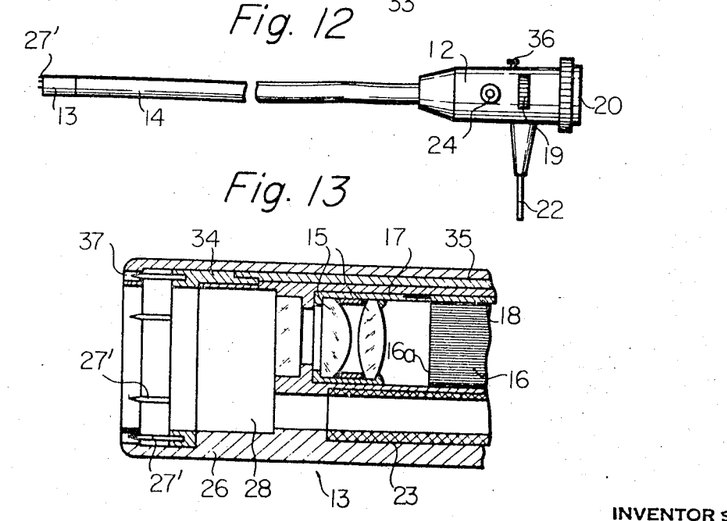
FIG. 12 is a general view similar to FIG. 2 but showing a modification of the minor endoscope of the present invention.
FIG. 13 is a fragmentary sectional view of the forward end portion of the minor endoscope shown in FIG. 12 with the pricking needles shown retracted.
Figure 14:
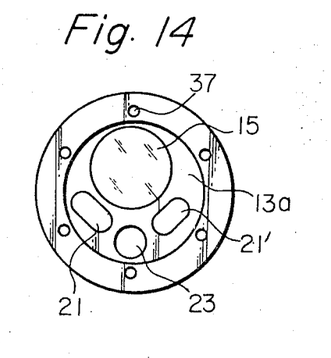
FIG. 14 is a front view of the forward end portion shown in FIG. 13.
Figure 15:
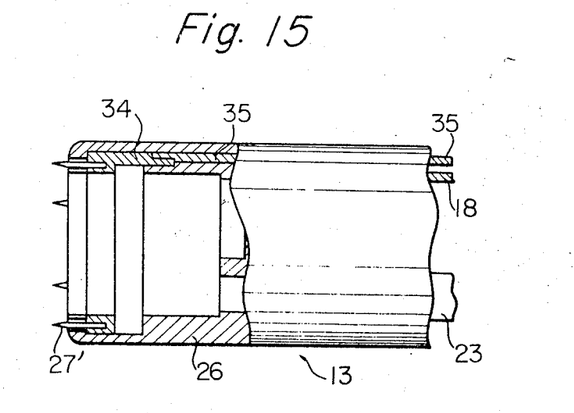
FIG. 15 is a view similar to FIG. 13 but showing the needles extended beyond the cylindrical wall.

The embodiment of the present invention as shown in FIGS. 1 to 7 and 9 is very effective to fix the forward end portion 13 of the minor endoscope 2 and the optical axis of the objective lens system 15 relative to the object in contrast to the prior art endoscope as shown in FIGS. 10 and 11 wherein the magnifying objective lens system 33 or 33' provided at the forward end of the forward end portion of the endoscope and the front-end surface 33a or 33'a of the front element of the objective lens system 33 or 33' directly contacts with the object thereby tending to cause the relative sliding movement between the object and the forward end portion of the endoscope.

A modification of the embodiment shown in FIGS. 1 to 7 and 9 is shown in FIGS. 12 to 17. The modification shown in FIGS. 12 to 17 is similar to that shown in FIG. 2 except that the pricking needles 27' are provided at the front-end edge of a needle-supporting ring 34 slidably fitted in the cylindrical wall 26 in spaced relationship from each other and the needle-supporting ring 34 is controllably shifted axially by a wire 35 extending through the elongated tube 14 with one end thereof secured to the ring 34 while the other end is operably connected to an operating knob 36 provided in the control housing 12 of the minor endoscope 2. Therefore, the needles 27' can be retracted to an inoperative position in the cylindrical member 26 and moved to an operative position in which they project beyond the front end edge of the cylindrical member 26 through openings 37 formed in the inwardly projecting annular portion at the front-end edge of the cylindrical wall 26 by the operation of the operating knob 36. This construction is advantageous in that the forward end portion 13 can be inserted through the guide channel 11 conveniently without damaging the interior wall of the channel 11 by retracting the needles 27' while the forward end portion 13 can be securely fixed to the object by extending the needles 27' after the cylindrical wall 26 contacts the desired portion of the object.

Figure 16:
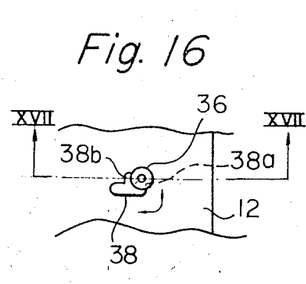
FIG. 16 is a fragmentary plan view showing the construction of the operating knob for actuating the pricking needles.
Figure 17:
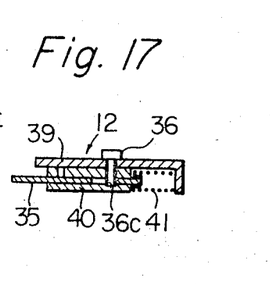
FIG. 17 is a fragmentary sectional view taken on the line XVII—XVII of FIG. 16.

FIGS. 16 and 17 show the mechanism for actuating the wire 35. The bolt 36c of the knob 36 is slidably fitted in an F-shaped groove 38 provided in the wall 39 of the control housing 12 and the bolt 36c is fixedly secured to a fastening member 40 movably located in the control housing 12 adjacent to the wall 39 to which the rearward end of the wire 35 is secured. A spring 41 may be provided so as to urge the fastening member 40 forwardly thereby causing the needles 27' to be extended beyond the front end edge of the cylindrical wall 26. In order to retract the needles 27', the knob 36 is manually shifted into the groove portion 38a of the F-shaped groove 38 so that the wire 35 is pulled to retract the needles 27' and held in its retracted position. In order to project the needles 27', the knob 36 is shifted to the groove portion 38b of the groove 38 so that the wire 35 is pushed forwardly.

Figure 18:
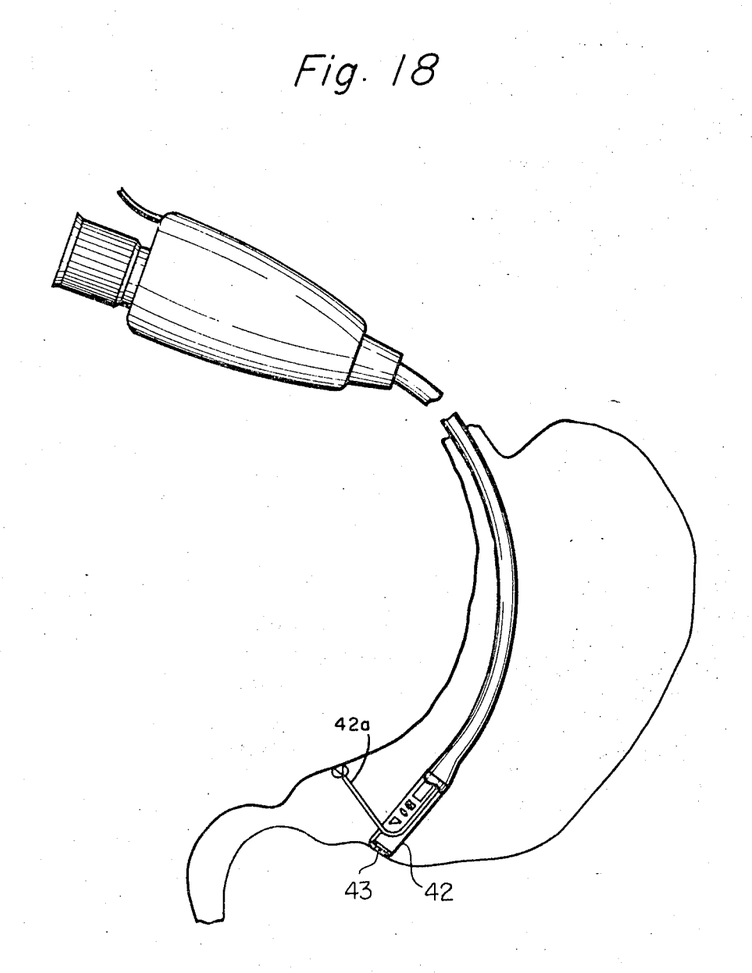
FIG. 18 is a view showing a further modification of the present invention embodying a side-viewing endoscope.
Figure 19:
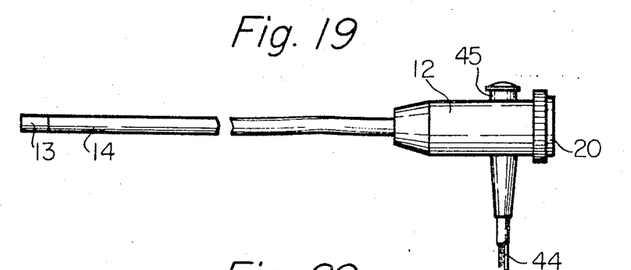
FIG. 19 is a general view similar to FIG. 2 showing a further embodiment of the minor endoscope of the present invention.
Figure 20:
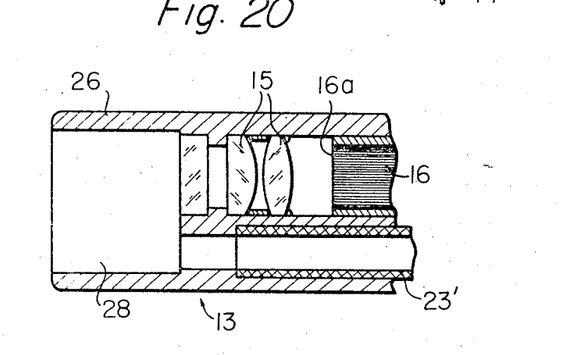
FIG. 20 is a fragmentary sectional view of the forward end portion of the minor endoscope shown in FIG. 19.
Figure 21:
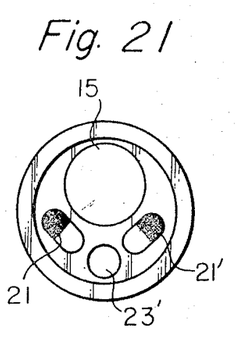
FIG. 21 is a front view showing the arrangement of various elements in the forward end portion of FIG. 20.

FIG. 18 shows an alternative form of the present invention applied to a side-viewing endoscope. The forward end of the forward end portion 42 is provided with a plurality of pricking needles 43 which prick the object when the forward end portion 42 contacts the appropriate portion of the inner wall of the hollow portion in which the forward end portion is inserted so that the desired portion to be observed is viewed through the optical system of the side-viewing endoscope. Thus, the forward end portion 42 is securely fixed to the body for facilitating the observation and the operation of various devices such as the illustrated forceps 42a to be used together with the endoscope.

FIGS. 19 to 22 show a further embodiment of the present invention. The minor endoscope shown in FIGS. 19 to 22 is similar to that shown in FIGS. 2 and 3 except that the pricking needles 27 are dispensed with and the pipe 23 is replaced by a suction pipe 23' the rearward end of which is connected to a vacuum pump (not shown) through a piping 44 so that the hollow space 28 is evacuated so as to firmly secure the object to the front-end edge of the cylindrical wall 26 when the same is contacted with the object by virtue of the vacuum produced in the hollow portion 28 in the cylindrical wall 26.

Figure 22:
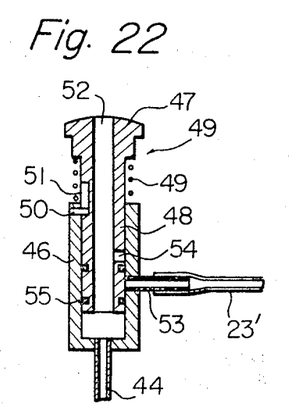
FIG. 22 is a sectional view showing the manually operable valve means provided in the control housing of the minor endoscope shown in FIG. 19.

In order to manually control the generation of the vacuum in the hollow space 28, a venting valve 45 is provided in the control housing 12. The valve 45 comprises a cylindrical member 46 secured to the control housing 12 and a pushbutton 47, the stem 48 of which is slidably fitted in the cylindrical member 46. A spring 49 is interposed between the pushbutton 47 and the upper end of the cylindrical member 46 so as to urge the pushbutton 47 outwardly of the cylindrical member 46. A pin 50 secured to the cylindrical member 46 slidably fits in an elongated groove 51 formed in the stem 48 so as to appropriately limit the stroke of the sliding movement of the stem 48 relative to the cylindrical member 46. The pushbutton 47 is provided with a through-hole 52 connecting the interior of the cylindrical member 46 with the atmosphere. A pipe 53 fixed in an opening formed in the peripheral wall of the cylindrical member 46 is connected to the rearward end of the pipe 23' while the inner end of the piping 44 leading to the vacuum pump is connected to an opening formed in the bottom wall of the cylindrical member 46. An opening 54 is formed in the peripheral surface of the stem 48 which communicates with the through-hole 52. The position of the opening 54 is selected such that it is aligned with the pipe 53 when the pushbutton 47 together with the stem 48 is depressed against the action of the spring 49 to the lowermost position in the cylindrical member 46 so that the pipe 53 communicates with the piping 44 through the opening 54 and the through-hole 52, while the pipe 53 is normally closed by the peripheral wall of the stem 48 when the pushbutton 47 and the stem 48 are urged upwardly to their uppermost positions by the action of the spring 49. In order to seal the stem 48 against the inner wall of the cylindrical member 46, O-rings 55 are located in the annular grooves formed in the peripheral wall of the stem 48 which airtightly contact the inner wall of the cylindrical member 46.

In operation, the vacuum pump is driven continuously. However, insofar as the pushbutton 47 is in its uppermost position the pipe 53 is closed and the air is forced through the through-hole 52 from the atmosphere into the vacuum pump, and no exhausting action is applied to the hollow space 28 through the suction pipe 23'. However, when the pushbutton 47 is depressed against the action of the spring 49 with the outer opening of the through-hole 52 closed by the finger of the operator so that the stem 48 is moved to its lowermost position, the pipe 23' communicates with the piping 44 through the opening 54 and the through-hole 52. Since the outer opening of the through-hole 52 is closed by the finger, the suction force of the vacuum pump is immediately applied to the hollow space 28 through the pipe 23', thereby firmly fixing the object to the forward end portion 13 by virtue of the vacuum produced in the hollow space 28 in the cylindrical wall 26. When the pushbutton 47 is released to be moved upwardly by the action of the spring 49, the pipe 53 is closed so that the vacuum is held in the hollow space 28. When the outer opening of the through-hole 52 is opened while the pushbutton 47 is held in its lowermost position, air is introduced through the through-hole 52 and the pipe 23' thereby permitting the object to be freed from the forward end portion 13. These operations are effected while the vacuum pump is continuously driven.

We claim:

1. An endoscopic apparatus adapted to be inserted into a cavity of a body for viewing a portion of the body in said cavity, and comprising, in combination:
   a. a first endoscope and a second endoscope,
      1. said first endoscope including a first, elongated, tubular member having longitudinally terminal first front and rear parts, and a first flexible part intermediate said terminal first parts;
   b. a guide channel longitudinally extending in said first intermediate part and said first front part,
      1. said second endoscope including a second, elongated, tubular member having longitudinally terminal second front and rear parts, and a second flexible part intermediate said terminal second parts,
      2. said second intermediate part being releasably received in said guide channel, said second front part projecting from said first front part in the direction of elongation of said first tubular member, and said second rear part projecting outward of said first tubular member adjacent said first rear part;
   c. first and second optical systems respectively associated with said first and second tubular members,
      1. each optical system including objective lens means on the associated front part for receiving an image of said body portion, an ocular on the associated rear part, and image-transmitting means in the associated intermediate part for transmitting the image received by said objective lens means to said ocular,
      2. said second optical system having a magnification much greater than the magnification of said first optical system;
   d. a tubular wall member projecting from said second front part in the direction of elongation of said second tubular member, said wall member laterally bounding a chamber having an end open in said latter direction, said wall member having a free edge portion extending in a closed loop about said open end in a plane transverse to said latter direction; and
   e. securing means for holding said edge portion fixedly engaged with said body portion and for thereby preventing shifting of the objective lens means of said second optical system relative to the engaged body portion.

2. An apparatus as set forth in claim 1, said securing means including a plurality of elongated needles, and fastening means for fastening said needles to said wall member in respective operative positions in which said needles project beyond said edge portion in a common direction outward of said chamber while spaced from each other transversely of said direction.

3. An apparatus as set forth in claim 2, said fastening means including a fastening member carrying said needles, and moving means accessible outside said cavity when said second front part is inserted in said cavity for moving said fastening member relative to said wall member in said common direction, and for thereby moving said needles between said operative positions thereof and respective inoperative positions in which said needles are retracted rearward of said plane.

4. An apparatus as set forth in claim 1, said chamber normally communicating with the ambient air through said open end, said securing means including evacuating means for withdrawing air from said chamber while said edge portion engages said body portion in said cavity.

5. An apparatus as set forth in claim 4, said evacuating means including suction means communicating with said chamber through said second rear part, and venting means on said second rear part for venting said suction means to said ambient air.

6. An apparatus as set forth in claim 1, wherein the objective lens means of said second optical system bounds said chamber in a direction away from said open end, and focusing means for focusing said last-mentioned objective lens means on said plane.

7. An apparatus as set forth in claim 1, further comprising means on said second rear part for introducing a liquid into said chamber while said edge portion engages said body portion in said cavity.

8. An apparatus as set forth in claim 1, further comprising bending means for bending said first intermediate part about an axis transverse to the direction of elongation of said first tubular member, whereby respective portions of said first intermediate part are stressed in tension and in compression respectively, said portions being separated by a neutral surface extending longitudinally of said first tubular member, the image-transmitting means of said first optical system including a plurality of light-transmitting optical fibers elongated in the direction of elongation of said first tubular member and closely adjacent said neutral surface.

* * * * *